2 Sheets--Sheet 1.
D. BUIST & C. E. ALDEN.
Broadcast Seeding-Machine.
No. 161,747. Patented April 6, 1875.
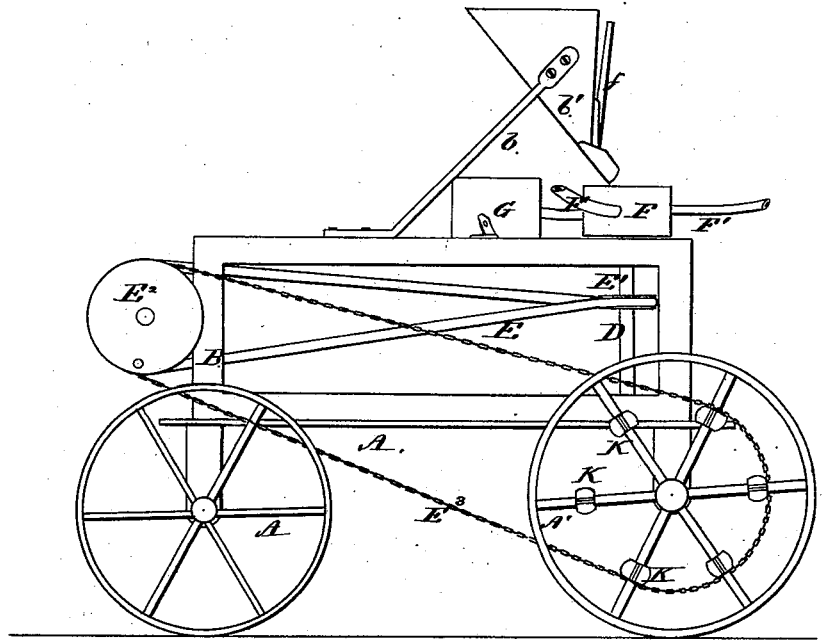
Fig. 1
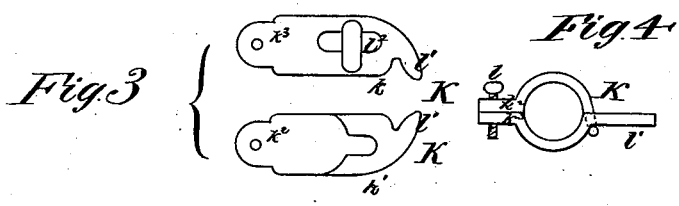
Fig. 3 { Fig. 4
Witnesses
F. Frank Hartman
J. P. Connolly
Inventors
David Buist
Chas. E. Alden
By Connolly Bros
Attys
THE GRAPHIC CO.PHOTO-LITH.39 & 41 PARK PLACE,N.Y.

2 Sheets--Sheet 2

D. BUIST & C. E. ALDEN.
Broadcast Seeding-Machine.

No. 161,747. Patented April 6, 1875.

Witnesses: J. B. Connolly, H. A. Connolly

Inventors: David Buist, Chas. E. Alden
By Connolly Bros. Attorneys

THE GRAPHIC CO.PHOTO-LITH.39 & 41 PARK PLACE,N.Y.

UNITED STATES PATENT OFFICE.

DAVID BUIST AND CHARLES E. ALDEN, OF PHILADELPHIA, PA.

IMPROVEMENT IN BROADCAST SEEDING-MACHINES.

Specification forming part of Letters Patent No. 161,747, dated April 6, 1875; application filed November 28, 1874.

*To all whom it may concern:*

Be it known that we, DAVID BUIST and CHARLES EDWIN ALDEN, of Philadelphia, in the county of Philadelphia and State of Pennsylvania, have invented certain new and useful Improvements in Broadcast Seeding-Machines; and we do hereby declare the following to be a full, clear, and exact description of the invention, such as will enable others skilled in the art to which it pertains to make and use it, reference being had to the accompanying drawings, which form part of this specification, in which—

Figure 2:
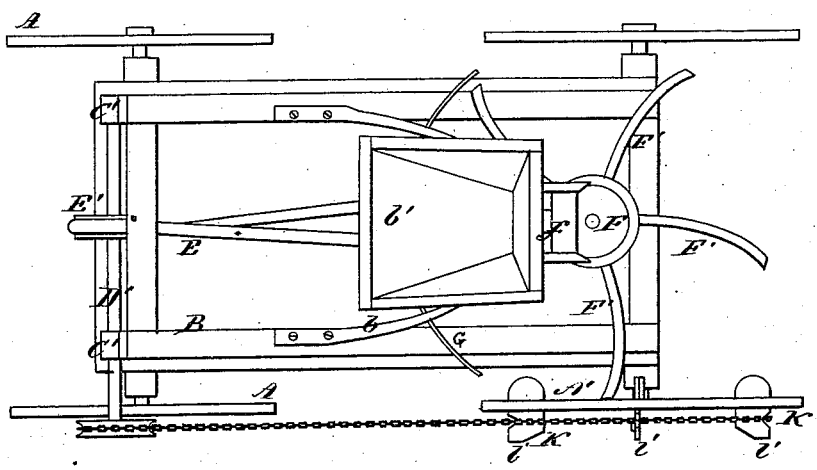
Figure 5:
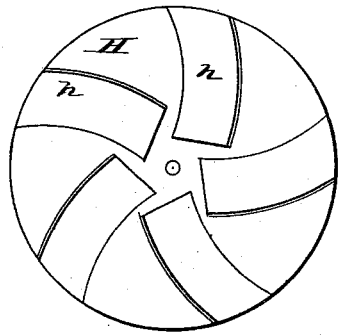
Figure 6:
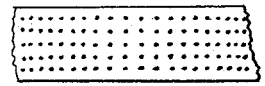

Figure 1 is a side elevation of our invention. Fig. 2 is a plan view. Figs. 3 and 4 are details; and Fig. 5 is a plan view of a modification. Fig. 6 is a section or part of a modification.

This invention has relation to broadcast seed-sowers; and consists in the novel construction and combination of parts, having reference particularly to the construction, specifically, of a centrifugal broadcast seed-distributer with laterally and upwardly curved tubes, all as hereinafter more fully described.

Referring to the accompanying drawing, A designates the body of a farm-wagon or equivalent vehicle, mounted on wheels A A', to one of the latter of which are attached the studs for the endless chain. B designates the frame of the seeder, of rectangular or other suitable form, upon the top of which are erected the standards $b$, supporting the hopper $b'$. The said frame is mounted upon the bed or bolsters of the wagon, and is provided at its rear end with boxes, in which turns a vertical shaft, D, and at its forward end with boxes C', in which turns a horizontal shaft, D'. Motion is communicated to the shaft D from shaft D' by means of the endless crossed belt E, passing around pulleys $E^1$, as shown. Upon the outer end of the horizontal shaft D' is fitted a pulley or chain-wheel, $E^2$, around which passes the chain $E^3$ from the power or motor wheel A'. Upon the upper end of the shaft D is arranged the rotary broadcast-seeder, which ordinarily (except for sowing oats, timothy, mustard-seed, or other very fine seed) consists of a central cylindrical cup, F, from which proceed radial or curved tubular arms F', communicating with the interior of said cup, and preferably formed with their outer ends turned upward slightly, as shown. The cup F is located directly under the spout of the hopper $b'$, from which the seed drops, the flow being regulated or controlled by means of a slide, $f$. G designates a curved guard or fender, secured to the top of the seeder-frame, and designed to prevent the scattering of seed forward in the direction of the horses.

The sowing or scattering of the seed is obviously effected by centrifugal impulse when the seeder is rotated, the seed passing from the cup through the tubular arms, and thence to the ground, upon which it is very thoroughly scattered.

For sowing oats we employ the modified form of scatterer shown in Fig. 5, consisting of a disk, H, having oblique curved wings $h$, slightly inclined from the face of the disk. The oats, which would probably choke up the tubular arms F', if the latter were used, pass freely between the wings, and escape at the edge of the disk.

For sowing timothy, mustard, or other very fine seed, we employ a scatterer similar to the one for sowing oats, but having, in addition to the wings, a perforated rim, as shown in Fig. 6 at I.

As the devices pertaining to the seeding mechanism are designed for application to an ordinary wagon, we construct the studs K, which are attached to the motor-wheel A', so as to be easily applied and detached, and hence form them, each, of two plates, $k\ k^1$, correspondingly recessed, so as to include the spokes, and provided with abutting ears $k^2\ k^3$, through which passes a screw, $l$, securing the plates rigidly together. The plate $k$ has an extension of one end terminating in a hook, $l^1$, to receive the links of the chain, and having a slot, $l^2$, for the reception of a T-sloped projection from the plate $k^1$. The plates are fitted together, and held at one end of the stud or clamp, in applying them to the spokes, by holding them at right angles to each other, passing the T projection through the slot, and then turning them until, the spoke being included, the ears $k^2\ k^3$ come together. The clamp is then adjusted to its proper position upon the spoke, and fastened by means of the screw through the ears.

The capability of adjustment upon the spokes constitutes a very important feature of the stud-clamps, enabling them to be arranged at any distance required from the hub, and the speed of the scatterer to be thereby regulated.

Having fully described our invention, we claim—

1. The broadcast centrifugal scatterer or distributer F, having the tubular arms F', curving laterally and upwardly, substantially as shown and described.

2. The stud-clamps, constructed substantially as described, to be detachable from, and adjustable upon, the spokes of any ordinary wheel A, substantially as and for the purpose specified.

In testimony that we claim the foregoing we have hereunto set our hands this 29th day of August, 1874.

DAVID BUIST.
CHAS. E. ALDEN.

Witnesses:
C. A. CONNOLLY,
M. DANL. CONNOLLY.